3,687,699
GRANULATING TACKY ELASTOMERIC MATERIALS
Robert M. Prosser, Wilmington, Del., and Nelson A. Thomas, Valley Station, Louisville, Ky., assignors to E. I. du Pont de Nemours and Company, Wilmington, Del.
No Drawing. Filed Nov. 29, 1968, Ser. No. 780,226
Int. Cl. B44d 1/094
U.S. Cl. 117—4                                                 5 Claims

ABSTRACT OF THE DISCLOSURE

Tacky, elastic, agglomerative solid materials such as chloroprene polymers are granulated by mechanical cutting in processes in which (1) water is sprayed into the vicinity of the cutting action at the rate of from .02 to .15 pound per pound of tacky material, (2) enough air, having a relative humidity less than 60% and a temperature not over 20° C., is brought into contact with the spray to evaporate substantially all of it, and (3) simultaneously a dusting agent such as talc is brought into contact with the tacky material being cut, at the rate of .02 to .10 pound per pound of tacky material.

BACKGROUND OF THE INVENTION

This invention is in the field of subdividing materials which are characterized by tackiness, elasticity, and a tendency of the particulate materials to agglomerate to each other. It is particularly concerned with improvements in granulating methods which are carried out in mechanical cutters or granulators employing cutting blades. Tacky materials tend to adhere to and pile up on the cutters, and even if this tendency can be avoided, the granulated material agglomerates upon storage, especially above about 25° C.

The problem of granulating tacky materials is not new. In U.S. Pat. 2,245,040 issued June 10, 1941 to Bernard M. Marks the tendency of granular polyvinyl acetate to agglomerate and become tacky upon heating above its softening point was noted, and was overcome in that case by coating the granular polyvinyl acetate with lubricating substances of fatty nature, solid at room temperature. Unfortunately the presence of such fatty solids is often deleterious in elastomers especially in polychloroprene elastomers. Similarly, talc has been used to prevent neoprene chips from agglomerating during storage.

It has also been common practice to harden tacky materials for grinding by mixing them with solid carbon dioxide (Dry Ice). This is effective and does not adulterate the material, but it does very substantially increase the cost of the final product and hence is not used except as a last resort. Also, as soon as the carbon dioxide has volatilized away, and its cooling effect has thus been lost, the ground particles resume their tendency to agglomerate.

SUMMARY

Now according to the present invention it has been found that tacky, elastic, agglomerative particulate materials such as chloroprene polymer chips can be granulated by mechanical cutting action by processes in which (1) during granulation there is sprayed into the vicinity of the cutting action, per pound of tacky material, about from .02 to .15 pound of water, (2) enough air, having a relative humidity less than 60% and a temperature not over 20° C., is brought into contact with the spray to evaporate substantially all of the water therein, and (3) simultaneously there is introduced into the vicinity of the cutting action, per pound of tacky material, about from .02 to .10 of a dusting agent such as talc.

DESCRIPTION OF THE PREFERRED EMBODIMENTS

The material subdivided according to a process of this invention is initially tacky, elastic and agglomerative. It is as to such materials that the special problems exist which are solved by the invention. They are tacky in that they stick to most surfaces with which they make contact and thus tend to adhere to the subdividing equipment. They are elastic in that when stretched or compressed they show some recovery. They are agglomerative in that even when subdivided or granulated the particles adhere with some force to each other.

Elastomeric polymers, such as natural and synthetic polyisoprenes, chlorosulfonated polyethylenes, chloroprene polymers (neoprenes), styrene-butadiene copolymers, butadieneacrylonitrile copolymers, and terpolymers of ethylene propylene and conjugated dienes are representative of elastic materials which under at least some conditions exhibit tackiness and can nevertheless be subdivided according to processes herein disclosed.

It should be clearly understood that in the novel processes the tacky materials are subdivided by mechanical cutting or shearing action. This action is in contrast to the crushing or grinding action of impact or attrition mills. It has the effect of granulating the product, for example to ¼-inch mesh particles, but does not purport to give a finely-divided or pulverized product. The starting material can be in the form of a plastic solid mass, but preferably will be in the form of chips which are say, ¼-inch thick, 1 inch wide, and 1½-inches long. Chloroprene polymers are conventionally available as such chips. The finished product subdivided by a process of the invention is characterized by a relative freedom from reagglomeration.

The water used in the processes is sprayed into the vicinity of the cutting action as droplets. Advantageously the droplets are fine, having a maximum diameter of less than ⅟₁₆-inch. Preferably the water is atomized, either by injecting it under pressure through a nozzle or by injecting it together with air through a spray nozzle. The spray is directed into the vicinity of the cutting action but it need not actually impinge on the tacky material, although such impingement can be tolerated. Preferably the water is cool—say, below 25° C., but it wil be understood that the evaporation cooling far offsets any opposite effect sustained through use of warmer water—say, up to 30° C.

The amount of water used is critical and should be in the range of .02 to .15 pound, preferably from .04 to .12 pound, per pound of tacky material. Lesser amounts do not provide adequate cooling, while greater amounts leave the products undesirably wet and require excessive amounts of air or a further drying step which tends to cause particle reagglomeration.

The cooling air contacts the spray in the vicinity of the cutting action. It may incidently pass over the tacky material being granulated but little cooling could be accomplished by the air alone. As already noted, some of the air can be admitted as the atomizing agent for the water.

The relative humidity of the incoming air is very important. It must be less than 60%, preferably less than 50%, and indeed, the lower the better from the standpoint of evaporative cooling. The temperature of the incoming air is also important. It must be not over 20° C., preferably less than 18° C.

The proportion of cool, non-humid air used will depend on its actual temperature and relative humidity. The lower both of these values are, the less air will be required. The amount of air used must, in any event, be sufficient to evaporate substantially all (i.e. at least 90%) of the water in the water spray, and this amount is, of course, admitted to the vicinity of the cutting action to effect evaporation of the water therein.

The dusting agent used in a process of this invention is a solid, inert material in particulate, finely-divided form. The particle size is preferably such as to pass a 325-mesh screen, and will ordinarily be so small that the agent has a surface area of greater than 300 square meters per gram. Silica, alumina, diatomaceous earth, and talc are available fitting this description, and any of these can be used, talc being preferred. The dusting agent is brought into contact with the tacky material simultaneously with the spraying and evaporation of the water and, of course, during the cutting action.

The amount of dusting agent used is also critical. This amount is broadly from .02 to .10 pound, preferably .04 to .08 pound, per pound of tacky material. More than these maxima unduly adulterates the final product; less than the minima is inadequate to cover the tacky material as its surface area increases due to the granulation of the product. The dusting agent can be blown into the vicinity of the cutting action or otherwise caused to make contact with the tacky material, uniform distribution on the freshly cut surfaces of the tacky material particles being the objective.

EXAMPLE

The invention will be better understood by reference to the following illustrative example:

The equipment consists of a rotary cutter (granulator) having seven blades 50" long on a rotor turning at 614 r.p.m. provided with a covered hopper, etc. as described below. The blade edges travel in a 20-inch diameter circle and cut against a single bed knife. The covered hopper for the granulator is of rectangular shape and is provided with means for feeding talc by a screw feeder near the bottom of one side, means for feeding polychloroprene (neoprene) chips through a trap door in the opposite side, a 12-inch circular duct opening for feed of cool air near the center of one of the remaining sides and just below that four inlets for feeding atomized sprays of water. A conventional granulator screen having $\frac{5}{16}$-inch openings permits flow of the talc-coated, chipped product from the bottom of the granulator along with the air, which now contains most of the water in vapor form.

Polychloroprene, made as described in U.S. Pat. 3,326,-824, Example 1, and in the form of chips approximately $\frac{1}{4}"$ x $1"$ x $1\frac{1}{2}"$ was fed at 2000 lbs. per hour, talc was fed at 100 lbs. per hour and water at 9 gallons per hour was atomized by a flow of 90–120 cubic feet of air per hour, and air at a temperature of about 18° C. and a relative humidity of about 60% was fed at 48,000 cubic feet per hour.

The chopped polychloroprene coming from the granulator exit showed a volatiles content of 0.8% and a temperature of 20–25° C. After conveying to a bagger by means of a vibrating conveyer, which removed loose talc, and bagging, the product could be stored at up to 20° C. in eight-bag-high pallets without "massing" or adhering together.

We claim:
1. In a process for subdividing tacky, elastic, agglomerative materials by mechanical cutting action, the improvement which comprises (1) spraying water into the vicinity of the cutting action at the rate of from .02 to .15 pound per pound of tacky material, (2) feeding into contact with the spray in the vicinity of the cutting action enough air, at a relative humidity less than 60% and a temperature not over 20° C., to evaporate substantially all of said sprayed water, and (3) simultaneously bringing into contact with the tacky material being cut a dusting agent at the rate of .02 to .10 pound per pound of tacky material.

2. A process of claim 1 wherein the tacky material is a chloroprene polymer.

3. A process of claim 1 wherein the tacky material is chlorosulfonated polyethylene.

4. A process of claim 1 wherein the dusting agent is talc.

5. In a process for subdividing a chloroprene polymer in the form of chips by mechanical cutting action, the improvement which comprises (1) atomizing water into the vicinity of the cutting action at the rate of from .04 to .12 pound per pound of said polymer, (2) feeding into contact with the atomized water in the vicinity of the cutting action enough air, at a relative humidity less than 50% and a temperature less than about 18° C., to evaporate substantially all of said atomized water, and (3) simultaneously bringing talc into contact with the said polymer being cut, at the rate of .04 to .08 pound of talc per pound of polymer.

References Cited

UNITED STATES PATENTS

| | | | |
|---|---|---|---|
| 2,245,040 | 6/1941 | Marks | 117—100 |
| 2,761,177 | 9/1956 | Walters | 117—16 X |
| 2,767,149 | 10/1956 | Wendrow | 117—100 X |
| 2,866,731 | 12/1958 | Van Epp | 117—138.8 X |
| 2,881,098 | 4/1959 | Di Norscia | 117—138.8 X |
| 3,012,900 | 12/1961 | Kleinmann et al. | 117—100 X |
| 3,160,514 | 12/1964 | Wheelock | 117—138.8 X |
| 3,241,246 | 3/1966 | Pollock | 117—100 X |
| 3,328,188 | 6/1967 | Hererlein | 117—4 |
| 3,326,824 | 6/1967 | Graham | 117—100 X |
| 3,351,601 | 11/1967 | Blaga et al. | 117—100 X |

WILLIAM D. MARTIN, Primary Examiner

M. R. P. PERRONE, JR., Assistant Examiner

U.S. Cl. X.R.

177—16, 66, 100 C, 138.8 E, 138.8 UA